United States Patent [19]
Pozo Obeso

[11] Patent Number: 4,779,372
[45] Date of Patent: Oct. 25, 1988

[54] BRAIDED FISHING LINE LEADER

[76] Inventor: Rafael D. Pozo Obeso, General Mola, 4-4ª, Reinosa (Santander), Spain

[21] Appl. No.: 903,114

[22] Filed: Sep. 2, 1986

[30] Foreign Application Priority Data

Sep. 2, 1985 [ES] Spain .................................... 546.638

[51] Int. Cl.⁴ ............................................. A01K 91/00
[52] U.S. Cl. ................................................. 43/44.98
[58] Field of Search ................... 43/44.98; 428/36, 37, 428/365, 377, 378, 379, 398; 57/8, 9, 11

[56] References Cited

U.S. PATENT DOCUMENTS

| | | | |
|---|---|---|---|
| 1,376,730 | 5/1921 | Ruoss et al. | 43/44.98 |
| 2,257,953 | 10/1941 | Haskell | 87/6 |
| 2,577,466 | 12/1951 | Jones | 43/44.98 |
| 2,933,798 | 4/1960 | Miller et al. | 43/44.98 |
| 3,153,297 | 10/1964 | Grabowsky | 43/44.98 |
| 3,451,305 | 6/1969 | Christensen et al. | 43/44.98 |
| 3,464,140 | 9/1969 | Carabasse | 43/44.98 |

*Primary Examiner*—M. Jordan
*Attorney, Agent, or Firm*—Michael J. Striker

[57] ABSTRACT

A braided fishing line leader comprises a plurality of filaments each having a diameter in the order of micrometer and being interwoven into a hollow braided tube progressively reducing in diameter from a trailing end to a leading end thereof. The filaments include nylon threads interwoven with copper threads to increase density of the leader.

14 Claims, 3 Drawing Sheets

BRAIDED FISHING LINE LEADER

BACKGROUND OF THE INVENTION

The present invention relates to a braided fishing line leader.

Braided fishing lines leaders, particularly for fly-fishing, of the type under consideration are made of a plurality of thread or filaments interwoven into a hollow braided tube. The leaders are tapered towards a leading end portion of the leader. Such a fishing line leader has been disclosed in applicant's U.S. pending application Ser. No. 616,428.

In the mentioned patent application assumption was mad to the need of a great precision in the cast for trout fishing with "fly", as well as to the need of attaining a cast at the greatest possible distance, with the purpose of increasing the surface, over which one may actuate from a certain point or position for the fisherman.

It was also specified in said patent application that with respect to a fly line, the "leader" constitutes the element which, with less weight and more flexibility, gathers the impulse supplied by the line and transmits it in turn to the tippet and to the fly, for which said leader makes up the fundamental element, as the functionality and efficiency of the assembly is derived from the precision in the cast. In this sense, and as it is known, the leader should have a decreasing diameter toward the receiving end of the tip and at the same time must be flexible and if possible, elastic.

The fundamental object of U.S. patent application Ser. No. 616,428 was to obtain a leader with these characteristics, but without knots, also eliminating problems of other known leaders, as for instance, the trend to form and keep spires.

The leader of the said patent application has been formed of a braid, with threads of a micrometric diameter, preferably of nylon with a high resistance, elasticity and flexibility, and besides, with the special characteristic that said braid has adopted a tapered configuration, lacking any type of core, for which it was started from a certain number of threads in its butt end, corresponding to its greatest diameter, such threads being progressively eliminated and unitarily, that is, progressively reducing the number of threads which form the braid, which was translated into a progressive reduction of the fishing line leader diameter, without the occurrence of echelonings in practice, considering the micrometric character of the threads or filaments forming said braid.

In a more concrete mode, it was expected in the use of a braiding machine that the latter is held at a constant speed whilst the traction on the resulting braid was progressively decreased, which resulted in an increase in the density of the fabric whilst the number of threads that cooperate in the conformation of the braid decreases, and such a reduction in the number of threads determines the progressive narrowing of same, and the same effect may as well be attained by keeping constant the traction on the braid and varying the rotation speed of the braiding machine, or acting simultaneously and in combination of both variants.

In said patent application assumption was also made as to the possibility of setting up in the slack of the braid an absorbent material, as for instance, cotton, when it is simulated that the leader be submerged in water, but offering notwithstanding better provisions, and a further simplicity in the process of obtention of such a leader, in the case it lacks the core of absorbent material. The aforementioned application discloses a leader obtained on the basis of a tapered braid, hollow though coreless and notwithstanding sinking, allowing besides to regulate the density or speed of sinking of the fishing line leader.

SUMMARY OF THE INVENTION

It is an object of the present invention to provide an improved braided fishing line leader.

It is another object of the invention to provide a fishing line leader in which the aforementioned disadvantages of known leaders of the foregoing type will be eliminated.

These and other objects of the invention are attained by a braided fishing line leader comprising a plurality of filaments each having a diameter in the order of micrometer and being interwoven into a hollow braided tube progressively reducing in diameter from a trailing end to a leading end thereof to form a tapered leader, said filaments including nylon threads interwoven with metallic threads, to increase density of the leader so as to obtain a desired sinking thereof, said metalic threads being resistant and flexible.

Metallic threads may be joined to said nylon threads that have been previously braided.

Copper threads may be double threads and said nylon threads are double threads, which are twisted about each other.

A number of twists of said threads per centimeter of a tube length may be in the range between 0.1 and 40, preferably between 0.5 and 15.

Said nylon threads may be multiple braided threads and said copper threads may be double threads.

Said copper thread may be a single thread and said nylon threads may be braided double threads.

One nylon thread and two copper threads may be twisted about each other and a number of crossings per centimeter of a tube length is between 0.5 and 10.

Two nylon threads and one copper thread may be twisted about each other and a number of crossings per centimeter of a tube length is between 0.5 and 10.

The leader maybe formed of at least one compound thread including at least one copper thread, the number of compound threads may increase according to required density.

Nylon threads may be of a diameter between 0.076 and 0.127 mm and said copper threads may be of a diameter between 0.05 and 0.12 mm.

In manufacture of the fishing line leader, metallic threads may be supplied to a spindle and emerge from said spindle by radial unwinding by axial rotation of said spindle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENT

Figure 1A:
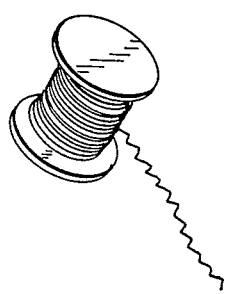
FIG. 1A shows a fishing line spool.

Referring now to the drawings in detail it will be see that the fishing line leader comprises a plurality of filaments interwoven into a hollow braided tube which has a leading end portion, an intermediate portion and a trailing portion, and in which the number of the filaments is progressively decreased throughout the length of the tube as well as the diameter of the tube so that a tapered leader results.

Filaments or threads of nylon are designated at "a" and filaments or threads of copper or any other suitable metal of required elasticity are denoted at "b".

Figure 1:
FIG. 1 shows aligned cut-away portions of a braided fishing line leader according to this invention.
Figure 5:
FIG. 5 shows, on enlarged scale, a part of the leading end portion of the line leader of FIG. 1, with smallest diameter and interwoven filaments.
Figure 4:
FIGS. 3 and 4 show, on enlarged scale, parts of intermediate portions of the fishing line leader of FIG. 1, with progressively reduced diameter with a corresponding reduction of the number of intertwined filaments.
Figure 3:
Figure 2:
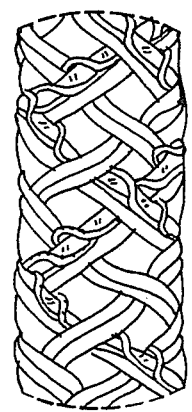
FIG. 2 shows, on an enlarged scale, a part of the trailing end portion of the fishing line leader having the largest diameter and largest number of intertwined filaments.
Figure 6:
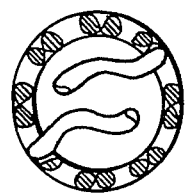
FIGS. 6 and 7 are sectional views through the parts of FIGS. 3 and 4 illustrating the ends of interrupted filaments lodged in the interior of the hollow braided leader.
Figure 11:
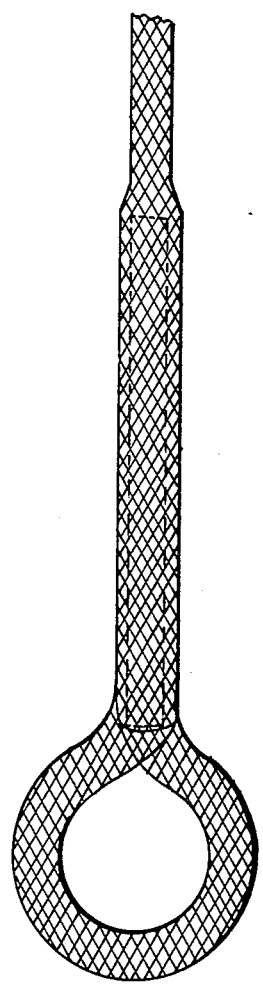
FIG. 11 is a modification of the butt end portion of the leader of FIG. 1.
Figure 9:
FIG. 9 shows a butt end of the fishing line leader with an inserted tip of the fishing line.
Figure 8:
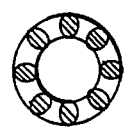
FIG. 8 is a sectional view of the leading end portion of FIG. 5.
Figure 10:
FIG. 10 shows the leading end portion of the fishing line leader with an inserted tip of smaller diameter.
Figure 7:

In the fishing line leader shown in FIGS. 1 through 11 one or more of micrometric threads of nylon are replaced by threads or filaments of metallic but flexible material which raises density of the leader as a whole.

In a preferred embodiment, copper has been chosen as the most ideal metallic material for the obtention of these threads, though obviously any other metal offering some similar characteristics may be used.

The mere substitution in the braiding machine of nylon thread bearing spindles for copper thread-bearing spindles is not feasible, because as nylon shows a considerably high coefficient of elasticity, and copper shows a practically void elasticity, the traction exerted to weave the braid determines the instant breaking of the copper threads and in consequence, a total operational inefficiency.

Attaining the regulation of the traction force up to the limits that may be withstood by the metallic threads, there occurs in the latter, due to their lack of elasticity, a stretching effect which in principle, is parallel to the stretching of the nylon threads, but which, after the elastic recuperation of the nylon threads, originates the formation of copper nodules, by accumulation of the remaining material, which in turn determines the appearance in the fishing line leader of bulks, which mean a high degree of irregularity for the fabric and for the leader itself in its whole.

Another important problem is based on the fact that on the currently used braiding machines, as it is known, the thread is extracted axially, which does not seem to be a problem in the case of nylon, but causes an important problem in the case of the copper threads, as for every turn of same over the corresponding spindle, at its outlet, a "spire" is created, due to it- helicoidal winding on the spindle, which spire turns into a nodule and debilitates the thread, causes its breaking at many places, and also causes protrusions in the tapered braid which cause that the surface of the fishing line leader becomes irregular.

All the above problems have been solved by this invention.

As from the basic idea of using metallic micrometric threads to increase the density of a fishing line leader obtained on the basis of a tapered braid, in which the feed of each metal thread is not made isolated but in combination with a nylon thread, which have been previously twisted to obtain with same a double thread, so that, given the nature of the materials that make up the one and the other thread, it is copper which winds on nylon and the latter one substantially supports the traction efforts, whilst the former stretches and shortens through its own winding or twisting, without practically suffering from any deformation and keeping a perfect regularity in its distribution with regard to the nylon thread accompanying it, which regularity in turn, is transmitted to the braid that forms the fishing line leader.

There is the possibility of twisting only one copper thread with only one nylon thread, or two copper threads may be braided jointly with a nylon thread, or only one copper thread be braided with two nylon threads.

For a normal leader, in which one starts from 16 or 32 threads, to end up generally with 8 or 12, according to the density or a sinking speed expected for same, only one multiple thread by means of combination by twist or braid of nylon and copper threads, or two or more multiple threads of the same characteristics, will be located in equiangularly distanced areas, to attain an adequate share of the metallic material over the tapered braid that forms the fishing line leade In the leaders made in accordance with the patent application Ser. No. 616,428, nylon threads are used, with a diameter between 0.076 and 0.127 mm. According to this invention such nylon threads can be combined with copper micrometric threads with a diameter between 0.05 and 0.12 mm.

As from these dimensions for the threads of one and the other nature, when the multiple thread provided to the conformation of the braid is formed by one only copper thread and one only nylon thread, which is subjected to twist, the number of twists or turns given to said couple of threads per every centimeter, can be between 0.1 and 40, and preferably between 0.5 and 15 twists per lineal centimeter.

Complementarily, when there are three threads which form the leader in the conformation of the twisted thread and which are related with each other through braiding, it has been expected that said threads be subjected to a number of crossings or braidings in the range between 0.5 and 10, per centimeter and preferably said number of crossings can be between 2 and 5 per centimeter.

Obviously, the afore-mentioned ranges determine that, the more are the number of twists or crossings of the threads, the more quantity of copper participating in the twisted thread, and in consequence, more quantity of copper participates in the leader result, with a further consequent density of sinking speed.

It must also be emphasized, that one or both ends of the braid that form the fishing line leader so obtained may be folded inside its slack, forming a loop for attaching the line and the tip to each other through said line and tip may be directly sticked inside the slack of the braid.

Furthermore, the use of a copper thread twisted with a nylon thread, or two threads of one or another material, that cooperate with a thread of the complementary material, copper has been fed at the expense of a radial shape spindle, that is, rotating the spindle whilst the copper is extracted, instead of remaining stationary as is the case in the conventional systems of axial extraction, with which the self twist of the copper thread which occurs in the last case, can disappear with the problems derived which have been note above.

It will be understood that each of the elements described above, or two or more together, may also find a useful application in other types of fishing line leaders differing from the types described above.

While the invention has been illustrated and described as embodied in a fishing line leader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A braided fishing line leader comprising a hollow single-piece elongated braided tube formed of a plurality of interwoven filaments each having a diameter in the order of micrometer, said tube progressively reducing in diameter from a trailing end to a leading end thereof to form a tapered leader, said filaments including nylon threads interwoven with metallic threads to increase density of the leader so as to obtain a desired sinking thereof, said metallic threads being resistant and flexible and being interwoven with said nylon threads which have been previously braided along an entire length of said tube.

2. The fishing line leader as defined in claim 1, wherein said metallic threads are formed of copper.

3. The fishing line leader as defined in claim 2, wherein said copper threads are double threads and said nylon threads are double threads, which are twisted about each other.

4. The fishing line leader as defined in claim 3, wherein a number of twists of said threads per centimeter of a tube length is in the range between 0.1 and 40.

5. The fishing line leader as defined in claim 4, wherein said number is in the range between 0.5 and 15.

6. The fishing line leader as defined in claim 2, wherein said nylon threads are multiple braided threads and said copper threads are double threads.

7. The fishing line leader as defined in claim 2, wherein said copper thread is a single thread and said nylon threads are braided double threads.

8. The fishing line leader as defined in claim 2, wherein one nylon thread and two copper threads are twisted about each other and a number of crossings per centimeter of a tube length is between 0.5 and 10.

9. The fishing line leader as defined in claim 2, wherein two nylon threads and one copper thread are twisted about each other and a number of crossings per centimeter of a tube length is between 0.5 and 10.

10. The fishing line leader as defined in claim 8, wherein said number is between 2 and 5.

11. The fishing line leader as defined in claim 9, wherein said number is between 2 and 5.

12. The fishing line leader as defined in claim 1, wherein said tube is formed of at least one compound thread including at least one copper thread, the number of compound threads may increase according to required density.

13. The fishing line leader as defined in claim 2, wherein said nylon threads are of a diameter between 0.076 and 0.127 mm and said copper threads are of a diameter between 0.05 and 0.12 mm.

14. The fishing line leader as defined in claim 1, wherein said metallic threads supplied to a spindle emerge from said spindle by radial unwinding by axial rotation of said spindle.

* * * * *